March 26, 1957     L. L. RAYMOND     2,786,620
ORNAMENTAL NUT CUP
Filed June 22, 1953

INVENTOR.
LAMBERT L. RAYMOND
BY
Chas. C. Reif
ATTORNEY

United States Patent Office 2,786,620
Patented Mar. 26, 1957

2,786,620

ORNAMENTAL NUT CUP

Lambert L. Raymond, Minneapolis, Minn.

Application June 22, 1953, Serial No. 363,030

1 Claim. (Cl. 229—1.5)

This invention relates to an ornament and particularly to such a device as a table ornament. It is quite customary to serve nuts and confections etc. with certain meals and it is also customary to have these in a small cup or receptacle.

It is an object of this invention therefore, to provide a cup or receptacle adapted to hold nuts, candy or other articles, the same being ornamental in appearance and easily and inexpensively made.

It is a further object of the invention to provide a receptacle or nut cup, the same being made from a sheet of ornamental material and comprising sections partially cut from said sheet and bent upwardly about a central area to form a receptacle.

It is another object of the invention to provide such an article as set forth in the preceding paragraph in which said sheet is of ornamental and symmetrical form preferably having a decorated edge and said sections also having decorated edges.

It is more specifically an object of the invention to provide a device formed of a flat sheet of lustrous and preferably colored material, said sheet having a perimeter comprising a series of substantially semi-circular portions, a section partially cut from said sheet symmetrical with each of said sections and having an inner uncut line about which they are bent upwardly to form a receptacle.

These and other objects and advantages of the invention will be fully set forth in the following description made in connection with the accompanying drawings in which like reference characters refer to similar parts throughout the several views and in which.

Figure 1:
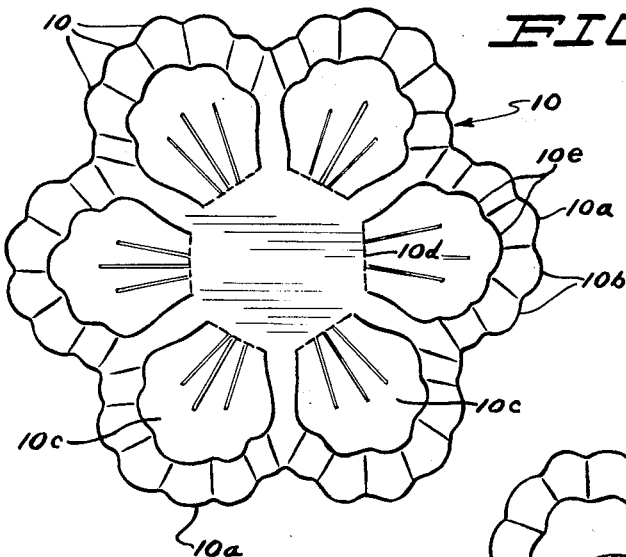
Fig. 1 is a plan view of a sheet of material formed in accordance wtih this invention.

Referring to the drawings, a device is shown comprising a supporting sheet 10. Said sheet is preferably made of rather stiff paper-like material, the same having a highly lustrous coating which may be either a silver-like coating or one having different colors. The sheet 10 will preferably be symmetrical about a transverse central line and while various symmetrical figures might be used, in the embodiment of the invention illustrated, sheet 10 is of generally hexagonal form, the perimeter thereof comprising six portions 10a having substantially semi-spherical edges. The edge of each of the portions 10a is provided with a plurality of scallops 10b. A number of sections 10c each symmetrical about a radius drawn from the center of sheet 10 to the mid point of the edge of a portion 10a are provided and each of these sections is cut from the sheet 10 except along an inner line 10d.

Figure 2:
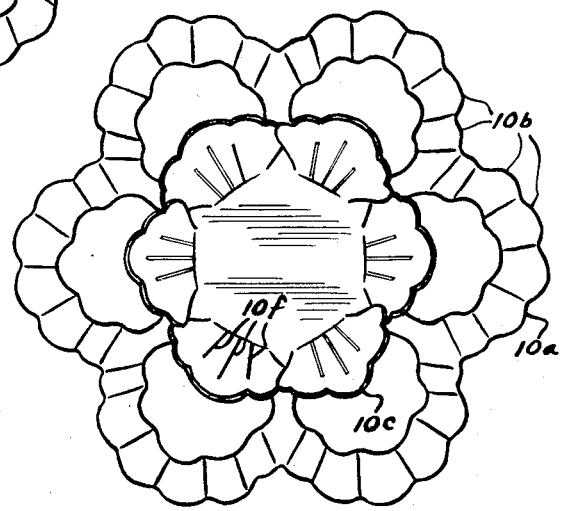
Fig. 2 is a plan view showing sections cut from the sheet shown in Fig. 1 and bent upwardly.
Figure 3:
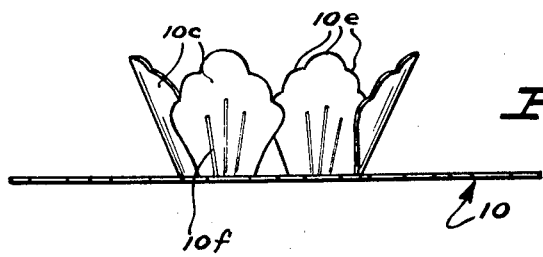
Fig. 3 is a view in side elevation of the device shown in Fig. 2.

The edges of the unattached portions of each section 10c are provided with a plurality of scallops or curved portions 10e. Each section 10c is bent slightly to have an inner concave surface and a central line or crease 10f is formed in said section. Lines or creases 10f are also formed in said sections at each side of said central line or crease and at equal distances therefrom. The sections 10c are then bent upwardly about the lines shown in Figs. 2 and 3. These upturned sections 10c thus form a receptacle.

In use, the device will be placed on a table and the sheet 10 will form a support. The receptacle formed by the upturned sections 10c is very well suited to receive nuts, small candies or any other desired articles.

From the above description it will be seen that I have provided a very simple and yet very decorative and attractive device, the same forming a very suitable receptacle for nuts or confections. The device is easily made by being cut from one sheet of material. The sheet 10 can be severed from the main sheet from which they are cut and the sections 10c cut at the same time. It is then only necessary to bend up the sections 10c. The device constitutes a very beautiful and ornamental piece for a table. The device can be easily packed and wrapped as the sections 10c can be brought substantially into the plane of the supporting portion 10.

The device has been amply demonstrated in actual practice, found to be very successful and efficient and is being commercially made.

It will of course, be understood that various changes may be made in the form, details, arrangement and proportions of the parts, without departing from the scope of applicant's invention, which generally stated, consists in a device capable of carrying out the objects above set forth, in the parts and combinations of parts disclosed and defined in the appended claim.

What is claimed is:

A nut cup comprising a member of lustrous flexible colored sheet material having a plurality of similar circumferentially arranged sections each symmetrical about a central line thereof extending from the center of said sheet, said sections having arcuate convex scalloped peripheries, each section having a portion cut therefrom along an outer line substantially parallel with said peripheries and along inwardly converging sides extending to a base line substantially perpendicular to said first mentioned line, said cut portions having their greatest width at their substantially central portions and being bent up along said base lines respectively to form an upwardly flaring receptacle with the sides of said cut out portions overlapping, the outer portion of said number remaining in one flat plane and forming a support for said receptacle, the same having a continuous periphery, said cut out portions having creases therein diverging outwardly from said base lines respectively.

References Cited in the file of this patent

UNITED STATES PATENTS

| | | |
|---|---|---|
| 450,884 | Gurtler | Apr. 21, 1891 |
| 1,267,968 | Bulle | May 28, 1918 |
| 1,746,966 | Purcell | Feb. 11, 1930 |
| 2,602,543 | Teufel | July 8, 1952 |

FOREIGN PATENTS

| | | |
|---|---|---|
| 313,156 | France | June 11, 1902 |